(12) United States Patent
Johnson et al.

(10) Patent No.: US 8,042,833 B2
(45) Date of Patent: Oct. 25, 2011

(54) STEERING WHEEL RELEASE/STROKING USING ACTIVE MATERIAL ACTUATION

(75) Inventors: Nancy L. Johnson, Northville, MI (US); Gunther Heim, Lampertheim (DE); Alan L. Browne, Grosse Pointe, MI (US); Jürgen Hulbert, Eltville (DE)

(73) Assignee: GM Global Technology Operations LLC, Detroit, MI (US)

( * ) Notice: Subject to any disclaimer, the term of this patent is extended or adjusted under 35 U.S.C. 154(b) by 49 days.

(21) Appl. No.: 12/406,191

(22) Filed: Mar. 18, 2009

(65) Prior Publication Data

US 2010/0237598 A1    Sep. 23, 2010

(51) Int. Cl.
    *B62D 1/00* (2006.01)
(52) U.S. Cl. .................................................. 280/777
(58) Field of Classification Search .............. 280/775, 280/777; 74/492, 493, 495; 188/376, 377, 188/267, 267.1; 267/140.14, 140.15
    See application file for complete search history.

(56) References Cited

U.S. PATENT DOCUMENTS

| 6,152,488 A | 11/2000 | Hedderly et al. |
| 6,384,518 B1 | 5/2002 | van Poppel |
| 7,731,235 B2 * | 6/2010 | Klukowski .................... 280/777 |
| 2009/0045042 A1 * | 2/2009 | Browne et al. ........... 204/157.15 |

* cited by examiner

*Primary Examiner* — Faye M. Fleming

(57) ABSTRACT

A tunable steering wheel release/stroking system adapted for use with a steering column, and to selectively absorb energy during a crash event, includes a steering column and an energy-absorbing element configured to receive a force from the column during the event, wherein the element is formed at least in part of an active material changeable between first and second phases when exposed to an activation signal, and configured so as to be caused to deform by and therefore absorb energy from the force at a first energy-absorbing magnitude in the first phase and at a second energy-absorbing magnitude in the second phase.

17 Claims, 2 Drawing Sheets

STEERING WHEEL RELEASE/STROKING USING ACTIVE MATERIAL ACTUATION

BACKGROUND

The present invention relates to steering wheel stroking systems, and more particularly, to a steering wheel stroking system and method of energy absorption utilizing active material actuation.

To reduce risk of injury to the driver during a crash event, conventional steering columns often feature energy-absorbing elements, such as a collapsible steering shaft, and break away mounting features. These features, more particularly, enable the steering column to give upon impact with the driver, in what is also known as "steering wheel stroking." While increasing safety, however, these features typically present one-size-fits-all allowances, wherein the rate of energy-absorption remains constant regardless of event or driver characteristics. Of further concern, the irreversible shearing and deformation typically provided by these systems result in one-time usage, which necessitates repair and/or the replacement of parts after use.

An energy absorption system wherein a variable damper is externally coupled to the column and driven by air-bag deployment has also been developed, but this system also presents concerns. For example, the addition of external structure creates packaging challenges in the typically tight spacing afforded steering columns. Moreover, with respect to driver safety it is appreciated that stroking optimization occurs near the end of or subsequent to, as opposed to at the beginning of, typical air bag deployment.

BRIEF SUMMARY

The present invention presents a steering wheel stroking system and method of energy absorption that utilizes active material actuation to permit tailoring of the stroking force and energy absorbing capability of the steering column based on sensor input as to the driver anthropometry and the specific nature of the crash event including such factors as the vehicle deceleration, vehicle speed, whether the driver is belted, whether the air bag has deployed, etc. The system is further useful to provide a facilely reset-able stroking system that does not require repair and/or replacement of parts after usage.

A first aspect of the invention concerns a steering column adapted for use with a motor vehicle and driver, and having selective energy-absorption capabilities. The column includes a structural member configured to transfer an impact force generated by the driver during a crash event. An energy-absorption element is communicatively coupled to the member so as to receive the force therefrom. The element is formed at least in part of an active material changeable between first and second phases, when exposed to an activation signal. The element is caused to deform by and therefore absorbs energy from the force at a first energy-absorbing rate in the first phase and at a second energy-absorbing rate in the second phase, during the event.

A second aspect of the invention concerns a method of effecting steering wheel stroking during a crash event utilizing active material actuation. The method comprises the steps of securing in a fixed position a steering column relative to a steering wheel, such that the column and wheel sustain an impact force, and cooperatively present a first rate of energy absorption during the event. The column is formed at least in part by an active material presenting a first phase. The method includes determining, either predictively or actually, the occurrence of the event, and then exposing the material to an activation signal so as to cause the material to change to a second phase, wherein the rate of energy absorption is modified as a result thereof, when the event is determined.

Thus, it is appreciated by those of ordinary skill in the art that the present invention provides a number of advantageous over conventional stroking systems. Other aspects and advantages of the invention, including exemplary embodiments of an energy absorbing element utilizing shape memory alloy, shape memory polymer, magnetorheological and electrorheological composites, piezoelectric material, telescoping parts and other configurations will be apparent from the following detailed description of the preferred embodiment(s) and the accompanying drawing figures.

BRIEF DESCRIPTION OF THE DRAWINGS

A preferred embodiment(s) of the invention is described in detail below with reference to the attached drawing figures, wherein.

DETAILED DESCRIPTION

The present disclosure concerns an energy absorption system 10 adapted for use with a steering column 12 (FIG. 1), such as the type typically comprising a motor vehicle (not shown). Generally, the inventive system 10 utilizes the capabilities of and unique properties exhibited by active materials to effect steering wheel stroking/release and/or stroking force during a crash event. As a result, it is appreciated that the stroking force and energy absorption experienced by the driver (also not shown) is more tailored in general to the specific nature of the crash event in comparison to conventional stroking systems. More preferably, the system 10 provides a selectively tunable and event and/or driver specific solution.

Figure 1:
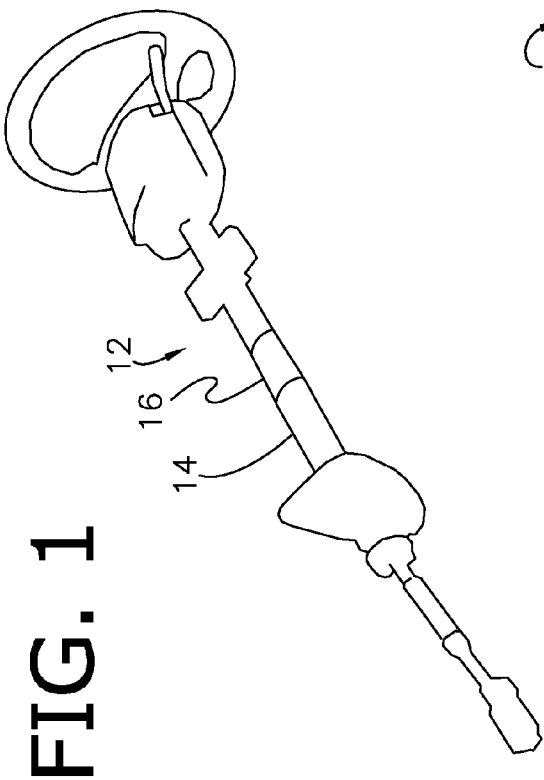
FIG. 1 is a perspective view of a steering column having an inventive energy-absorption element, in accordance with a preferred embodiment of the invention.

For the purposes of the present invention, it is appreciated that the column 12 includes at least one structural member 14, whose configuration results in the transfer of an impact force during a crash event, as is typically produced when the driver is caused to load the steering wheel either directly or through the driver air bag due to the sudden deceleration of the vehicle. The member 14 may be the steering shaft or a component thereof, as shown in FIG. 1, or a component of another part of the column 12, such as the bracket or jacket assembly.

The system 10 includes an energy-absorption element 16 that is communicatively coupled to the member 14 and configured to receive the force therefrom, during an event. The inventive element 16 is formed at least in part of an active material changeable between first and second phases, when exposed to an activation signal. The element 16 is configured such that it is caused to be deformed by and therefore absorbs energy from the force at a first energy-absorbing rate in the first phase and at a second energy-absorbing rate in the second phase, wherein the rates preferably present a relative difference of at least a 10%, more preferably, 25%, and most preferably, 100%.

As such, the system 10 further includes an activation source 18 (FIG. 2) configured to generate and deliver to the material an activation signal. As appreciated by those of ordinary skill in the art, the activation signal may be thermal, magnetic, electrical, chemical, and/or other like activation signal or a combination of activation signals dependent on the particular nature of the active material employed. In a vehicular setting, the source 18 may include the charging system of the vehicle, which is controllably coupled to the element 16 through conductive leads 20 (FIG. 2), or alternatively through wireless communication.

Source activation may be direct or indirect. Direct activation, it is appreciated, may result from heat by-product from the engine of the vehicle or from the pyrotechnic utilized to inflate the driver air bag. With respect to indirect activation, the leads 20 preferably engage the element 16, so as to deliver an electric current through the resistance of the material (FIG. 2), which in turn generates the thermal activation signal. This activation can be triggered by the crash itself or by sensor input indicating an increased probability of a crash. Especially relevant to the latter case in which a crash does not occur, system reset can occur preferably by the material reverting back to the original state upon discontinuation of the signal; or, for the classes of active materials that do not automatically revert upon discontinuation of the activation signal, alternative means can be employed to revert the active material to its original state.

I. Active Materials Discussion and Use

As used herein the term "active material" shall be afforded its ordinary meaning as understood by those of ordinary skill in the art, and includes any material or composite that exhibits a reversible change in a fundamental (e.g., chemical or intrinsic physical) property, when exposed to an external signal source. Thus, active materials shall include those compositions and those that exhibit a change in stiffness properties, shape and/or dimensions in response to the activation signal, which can take the type for different active materials, of electrical, magnetic, thermal and like fields.

Preferred active materials for use with the present invention include but are not limited to the classes of shape memory materials, combinations thereof, and materials that exhibit reversible changes in either modulus or shear strength. Shape memory materials generally refer to materials or compositions that have the ability to remember their original at least one attribute such as shape, which can subsequently be recalled by applying an external stimulus, as will be discussed in detail herein. As such, deformation from the original shape is a temporary condition. In this manner, shape memory materials can change to the trained shape in response to an activation signal. Exemplary shape memory materials include shape memory alloys (SMA), shape memory polymers (SMP), electroactive polymers (EAP), ferromagnetic SMAs, electrorheological fluids (ER), magnetorheological fluids (MR), dielectric elastomers, ionic polymer metal composites (IPMC), piezoelectric polymers, piezoelectric ceramics, various combinations of the foregoing materials, and the like.

Shape memory alloys (SMA's) generally refer to a group of metallic materials that demonstrate the ability to return to some previously defined shape or size when subjected to an appropriate thermal stimulus. Shape memory alloys are capable of undergoing phase transitions in which their yield strength, stiffness, dimension and/or shape are altered as a function of temperature. The term "yield strength" refers to the stress at which a material exhibits a specified deviation from proportionality of stress and strain. Generally, in the low temperature, or martensite phase, shape memory alloys can be plastically deformed and upon exposure to some higher temperature will transform to an austenite phase, or parent phase, returning to their shape prior to the deformation. Materials that exhibit this shape memory effect only upon heating are referred to as having one-way shape memory. Those materials that also exhibit shape memory upon re-cooling are referred to as having two-way shape memory behavior.

Shape memory alloys exist in several different temperature-dependent phases. The most commonly utilized of these phases are the so-called martensite and austenite phases discussed above. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature (As). The temperature at which this phenomenon is complete is called the austenite finish temperature (Af). When the shape memory alloy is in the austenite phase and is cooled, it begins to change into the martensite phase, and the temperature at which this phenomenon starts is referred to as the martensite start temperature (Ms). The temperature at which austenite finishes transforming to martensite is called the martensite finish temperature (Mf). Generally, the shape memory alloys are softer and more easily deformable in their martensitic phase and are harder, stiffer, and/or more rigid in the austenitic phase. In view of the foregoing, a suitable activation signal for use with shape memory alloys is a thermal activation signal having a magnitude to cause transformations between the martensite and austenite phases.

Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the martensite to austenite type transition, and the material will recover the original, annealed shape. Hence, one-way shape memory effects are only observed upon heating. Active materials comprising shape memory alloy compositions that exhibit one-way memory effects do not automatically reform, and will likely require an external mechanical force to reform the shape that was previously suitable for airflow control.

Intrinsic and extrinsic two-way shape memory materials are characterized by a shape transition both upon heating from the martensite phase to the austenite phase, as well as an additional shape transition upon cooling from the austenite phase back to the martensite phase. Active materials that exhibit an intrinsic shape memory effect are fabricated from a shape memory alloy composition that will cause the active materials to automatically reform themselves as a result of the above noted phase transformations. Intrinsic two-way shape memory behavior must be induced in the shape memory material through processing. Such procedures include extreme deformation of the material while in the martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles. In contrast, active materials that exhibit the extrinsic two-way shape memory effects are composite or multi-component materials that combine a shape memory alloy composition that exhibits a one-way effect with another element that provides a restoring force to reform the original shape.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the airflow control devices with shape memory effects, superelastic effects, and high damping capacity.

Suitable shape memory alloy materials include, without limitation, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like.

Shape memory polymers (SMP's) are known in the art and generally refer to a group of polymeric materials that demonstrate the ability to return to some previously defined shape when subjected to an appropriate thermal stimulus. Shape memory polymers are capable of undergoing phase transitions in which their shape is altered as a function of temperature. Generally, SMP's have two main segments, a hard segment and a soft segment. The previously defined or permanent shape can be set by melting or processing the polymer at a temperature higher than the highest thermal transition followed by cooling below that thermal transition temperature. The highest thermal transition is usually the glass transition temperature (Tg) or melting point of the hard segment. A temporary shape can be set by heating the material to a temperature higher than the Tg or the transition temperature of the soft segment, but lower than the Tg or melting point of the hard segment. The temporary shape is set while processing the material at the transition temperature of the soft segment followed by cooling to fix the shape. The material can be reverted back to the permanent shape by heating the material above the transition temperature of the soft segment.

In a preferred embodiment, the permanent shape of the active material is a substantially straightened shape defining a first length and the temporary shape of the active material is a similar shape defining a second length less than the first. In another embodiment, the shape memory polymer may present a spring presenting a first modulus of elasticity when activated and second modulus when deactivated.

The temperature needed for permanent shape recovery can be set at any temperature between about −63° C. and about 120° C. or above. Engineering the composition and structure of the polymer itself can allow for the choice of a particular temperature for a desired application. A preferred temperature for shape recovery is greater than or equal to about −30° C., more preferably greater than or equal to about 0° C., and most preferably a temperature greater than or equal to about 50° C. Also, a preferred temperature for shape recovery is less than or equal to about 120° C., and most preferably less than or equal to about 120° C. and greater than or equal to about 80° C.

Suitable shape memory polymers include thermoplastics, thermosets, interpenetrating networks, semi-interpenetrating networks, or mixed networks. The polymers can be a single polymer or a blend of polymers. The polymers can be linear or branched thermoplastic elastomers with side chains or dendritic structural elements. Suitable polymer components to form a shape memory polymer include, but are not limited to, polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly(ethyl methacrylate), poly(butyl methacrylate), poly(isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate). Examples of other suitable polymers include polystyrene, polypropylene, polyvinyl phenol, polyvinylpyrrolidone, chlorinated polybutylene, poly(octadecyl vinyl ether) ethylene vinyl acetate, polyethylene, poly(ethylene oxide)-poly (ethylene terephthalate), polyethylene/nylon (graft copolymer), polycaprolactones-polyamide (block copolymer), poly (caprolactone) dimethacrylate-n-butyl acrylate, poly (norbornyl-polyhedral oligomeric silsequioxane), polyvinylchloride, urethane/butadiene copolymers, polyurethane block copolymers, styrene-butadiene-styrene block copolymers, and the like.

The active material may also comprise an electroactive polymer such as ionic polymer metal composites, conductive polymers, piezoelectric material and the like. As used herein, the term "piezoelectric" is used to describe a material that mechanically deforms when a voltage potential is applied, or conversely, generates an electrical charge when mechanically deformed.

Electroactive polymers include those polymeric materials that exhibit piezoelectric, pyroelectric, or electrostrictive properties in response to electrical or mechanical fields. The materials generally employ the use of compliant electrodes that enable polymer films to expand or contract in the in-plane directions in response to applied electric fields or mechanical stresses. An example of an electrostrictive-grafted elastomer with a piezoelectric poly(vinylidene fluoride-trifluoro-ethylene) copolymer. This combination has the ability to produce a varied amount of ferroelectric-electrostrictive molecular composite systems. These may be operated as a piezoelectric sensor or even an electrostrictive actuator.

Materials suitable for use as an electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as a high electrical breakdown strength, a low modulus of elasticity (for large or small deformations), a high dielectric constant, and the like. In one embodiment, the polymer is selected such that is has an elastic modulus at most about 100 MPa. In another embodiment, the polymer is selected such that is has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films. Thicknesses suitable for these thin films may be below 50 micrometers.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Materials used for electrodes of the present disclosure may vary. Suitable materials used in an electrode may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

The active material may also comprise a piezoelectric material. Also, in certain embodiments, the piezoelectric material may be configured as an actuator for providing rapid deployment. As used herein, the term "piezoelectric" is used to describe a material that mechanically deforms (changes shape) when a voltage potential is applied, or conversely, generates an electrical charge when mechanically deformed. Preferably, a piezoelectric material is disposed on strips of a flexible metal or ceramic sheet. The strips can be unimorph or bimorph. Preferably, the strips are bimorph, because bimorphs generally exhibit more displacement than unimorphs.

One type of unimorph is a structure composed of a single piezoelectric element externally bonded to a flexible metal foil or strip, which is stimulated by the piezoelectric element when activated with a changing voltage and results in an axial buckling or deflection as it opposes the movement of the piezoelectric element. The actuator movement for a unimorph can be by contraction or expansion. Unimorphs can exhibit a strain of as high as about 10%, but generally can only sustain low loads relative to the overall dimensions of the unimorph structure.

In contrast to the unimorph piezoelectric device, a bimorph device includes an intermediate flexible metal foil sandwiched between two piezoelectric elements. Bimorphs exhibit more displacement than unimorphs because under the applied voltage one ceramic element will contract while the other expands. Bimorphs can exhibit strains up to about 20%, but similar to unimorphs, generally cannot sustain high loads relative to the overall dimensions of the unimorph structure.

Suitable piezoelectric materials include inorganic compounds, organic compounds, and metals. With regard to organic materials, all of the polymeric materials with non-centrosymmetric structure and large dipole moment group(s) on the main chain or on the side-chain, or on both chains within the molecules, can be used as candidates for the piezoelectric film. Examples of suitable polymers include, for example, but are not limited to, poly(sodium 4-styrene-sulfonate) ("PSS"), poly S-119 (poly(vinylamine)backbone azo chromophore), and their derivatives; polyfluorocarbons, including polyvinylidene fluoride ("PVDF"), its co-polymer vinylidene fluoride ("VDF"), trifluoroethylene (TrFE), and their derivatives; polychlorocarbons, including poly(vinyl chloride) ("PVC"), polyvinylidene chloride ("PVC2"), and their derivatives; polyacrylonitriles ("PAN"), and their derivatives; polycarboxylic acids, including poly(methacrylic acid ("PMA"), and their derivatives; polyureas, and their derivatives; polyurethanes ("PUE"), and their derivatives; bio-polymer molecules such as poly-L-lactic acids and their derivatives, and membrane proteins, as well as phosphate bio-molecules; polyanilines and their derivatives, and all of the derivatives of tetramines; polyimides, including Kapton molecules and polyetherimide ("PEI"), and their derivatives; all of the membrane polymers; poly(N-vinyl pyrrolidone) ("PVP") homopolymer, and its derivatives, and random PVP-co-vinyl acetate ("PVAc") copolymers; and all of the aromatic polymers with dipole moment groups in the main-chain or side-chains, or in both the main-chain and the side-chains, and mixtures thereof.

Further, piezoelectric materials can include Pt, Pd, Ni, Ti, Cr, Fe, Ag, Au, Cu, and metal alloys and mixtures thereof. These piezoelectric materials can also include, for example, metal oxide such as $SiO_2$, $Al2O_3$, $ZrO_2$, $TiO_2$, $SrTiO_3$, $PbTiO_3$, $BaTiO_3$, $FeO_3$, $Fe_3O_4$, ZnO, and mixtures thereof; and Group VIA and IIB compounds, such as CdSe, CdS, GaAs, $AgCaSe_2$, ZnSe, GaP, InP, ZnS, and mixtures thereof.

Suitable active materials also comprise magnetorheological (MR) compositions, such as MR elastomers, which are known as "smart" materials whose rheological properties can rapidly change upon application of a magnetic field. MR elastomers are suspensions of micrometer-sized, magnetically polarizable particles in a thermoset elastic polymer or rubber. The stiffness of the elastomer structure is accomplished by changing the shear and compression/tension moduli by varying the strength of the applied magnetic field. The MR elastomers typically develop structure when exposed to a magnetic field in as little as a few milliseconds. Discontinuing the exposure of the MR elastomers to the magnetic field reverses the process and the elastomer returns to its lower modulus state.

Suitable MR elastomer materials include, but are not intended to be limited to, an elastic polymer matrix comprising a suspension of ferromagnetic or paramagnetic particles, wherein the particles are described above. Suitable polymer matrices include, but are not limited to, poly-alpha-olefins, natural rubber, silicone, polybutadiene, polyethylene, polyisoprene, and the like.

II. Exemplary Configurations of Energy-Absorption

Figure 2:
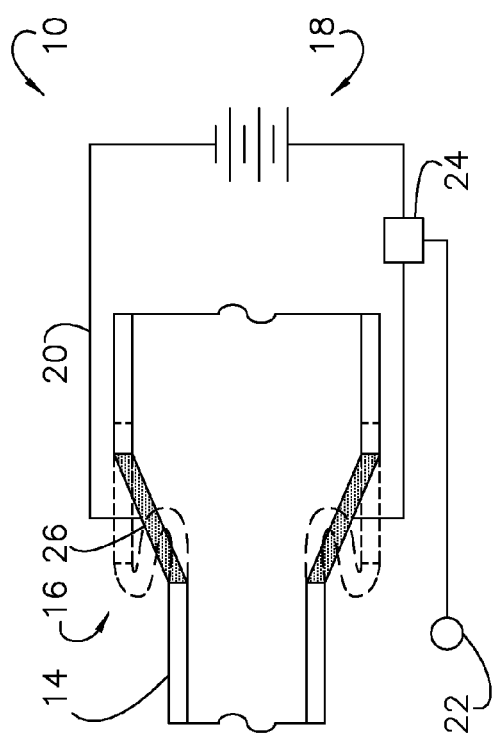
FIG. 2 is a side elevation view of a column segment including a first embodiment of the energy-absorption element, wherein a shape memory collapsible wall interconnects bifurcated sections of the column shaft.

Referring now to FIGS. 2 through 8, the illustrated exemplary embodiments of the system 10 teach the various aspects and benefits of the present invention, and are more particularly described as follows:

The preferred system 10 further includes at least one, and more preferably a plurality of sensors 22 operable to determine either an increased probability or the actual occurrence of a crash event. For example, the sensors 22 may include short and long range radar, lidar, camera-based and/or laser detection devices, as are conventionally utilized in lane-change assist, collision avoidance and other vehicular safety systems. The sensors 22 are preferably operable to predict an impending crash event, such as for example, by determining when an event probability threshold is exceeded, and to that end, the system 10 preferably includes a controller 24 communicatively coupled to the sensors 22 and intermediately to the source 18 and element 16, as schematically shown in FIG. 2. More preferably, the system 10 is selectively operable during front-end crash events only.

The sensors 22 and controller 24 are communicatively coupled to the element 16, and programmably configured to cause the signal to be generated when the event is predicted. In this configuration, however, it is appreciated that the system 10, because of potential for false positives must be resetable and not impact driving function in event of no crash. Alternatively, the sensors 22 may be operable to detect the actual event, and more particularly actual event-associated forces, displacements or accelerations. For example, at least one force transducer 22 may be coupled to the controller 24.

In a preferred embodiment, the system 10 is configured to provide a selected magnitude from a plurality of differing magnitudes of energy-absorption, preferably by altering the amplitude, pattern, or frequency of the activation signal, or the activated portion of the materials. For example, where severity is determinable, based for example on the vehicle mass, current velocity, crush force, nature of encountering object, seat belt usage, air-bag deployment, seat for-aft position and/or torso proximity to the steering wheel, the system 10 is preferably configured to increase the energy-absorption rate (magnitude of column stroking force) proportionally to the severity determination. More preferably, the controller 24 is also configured to receive an input related and the stroking force is modified according to an anthropometric characteristic of the driver, and/or the crash deceleration pulse of the vehicle, and that the stroking force is correlated to the input.

Returning to the structural configuration of the element 16, and in a first mode of operation, the stiffness or modulus of the material is increased, when the material is caused to change to the second phase by activation. The higher stiffness or modulus, correspondingly increases the magnitude of energy absorption. For example, in FIG. 2, first and second members 14 are intermediately interconnected by an energy-absorption element 16 consisting of a shape memory collapsible wall 26. The wall 26 is preferably continuous and presents a flared section of the member 14 having a tapered slope, so as to facilitate buckling during the event. In the first deactivated normally functioning phase the wall 26 is preferably less rigid but sufficiently stiff so as to support the column 12; in the second activated phase (shown in hidden-line type (FIG. 2)), the wall 26 becomes more stiff, so as to absorb greater amounts of energy as it deforms during the event. Alternatively, it is appreciated that the wall 26 may be more rigid and stiff in the deactivated state than in the activated phase, depending upon material selection and configuration.

Figure 3:
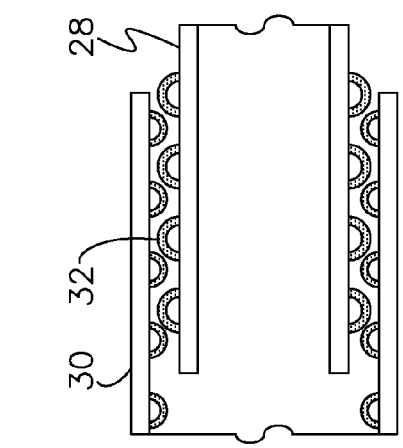
FIG. 3 is a side elevation view of a column segment including a second embodiment of the energy-absorption element, wherein the column includes telescoping first and second parts, and a plurality of shape memory bumps aligned and inter-engaged with the adjacent surfaces of the parts.

In another embodiment, the column 12 further includes telescoping first and second parts 28, 30, and the adjacent surfaces thereof present collapsible surface bumps 32 consisting of the active material and defining an interior space with the base part (FIG. 3). The parts 28, 30 are diametrically configured such that the bumps 32 are caused to inter-engage when the parts 28, 30 telescope, and more facilely collapse, when the material is in the first lower stiffness phase. By activating different numbers of the bumps and thus changing their stiffness the stroking force of the column can be selectively adjusted to match the requirements of the particular crash event.

Figure 4A:
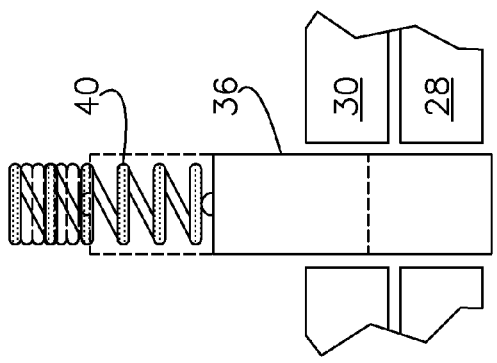
FIG. 4a is a partial elevation view of a column segment including an alternative third embodiment of the energy-absorption element, wherein the interlocking pin is coupled to a shape memory spring.
Figure 4:
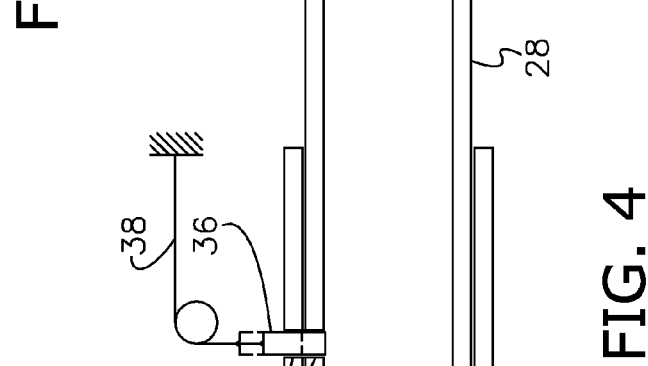
FIG. 4 is a side elevation view of a column segment including a third embodiment of the energy-absorption element, wherein the column includes telescoping first and second parts, and an interlocking pin releasably coupled to a shape memory wire, which pin engages the parts.

Another embodiment is shown in FIG. 4, wherein the absorption element 16 presents a mechanical interlock. More particularly, the parts 28, 30 in this configuration define alignable through-openings 34. One or more pins 36 matching the cross-sectional shape of the openings 34 (e.g., circular, ellipsoidal, polygonal) are tightly received therein, and present lengths sufficient to concurrently engage both parts 28, 30. As a result, when the one or more pins 36 are inserted within the openings 34 relative motion between the parts 28, 30 is prevented, as shown by solid-line in FIG. 4.

As illustrated, the one or more pins 36 are securely connected to a shape memory wire 38 preferably comprising a shape memory alloy. When thermally activated, it is appreciated that the crystal structure of the alloy reconfigures to the second phase, which in turn causes the wire 38 to shrink. The actuating or reconfiguring force is then transferred to the one or more pins 36, thereby resulting in the release of the interlock (as shown by hidden-line in FIG. 4). Alternatively, and as shown in FIG. 4a, a vertically oriented spring 40 also consisting of SMA material may be caused to longitudinally shrink and increase in spring modulus (k), upon thermal activation. Together, these actions cooperatively cause the pin 36 to be removed from the interior opening 34 with greater force than the afore-mentioned wire configuration. The weight of the pin 36 is preferably such that the spring 40 is caused to stretch when deactivated, thereby allowing the pin 36 to re-enter the openings 34. It is appreciated that if more than one pin 36 are used a select number of pins 36 based upon the crash severity can be pulled, so that the remaining pins 36 create a plowing force (further through metal working) between the stroking shafts matched to the needed level of energy absorption. Conversely, only one pin 36 can be initially engaged with an arbitrary additional number of pins 36 engaged through the action of SMA depending on the severity of the crash and the amount of energy that needs to be absorbed.

In another embodiment, the interlocking pins 36 are made of an active material whose stiffness can be altered by a temperature induced phase change such as SMP and SMA. By selectively activating a phase change in one or more pins 36 the stroking force of the column 12 can be adjusted either up or down in increments to match the requirements of the particular crash scenario (stroking force being generated by the mechanical interference and deformation of the pins 36 and surrounding telescoping structure during stroking).

Figure 5:
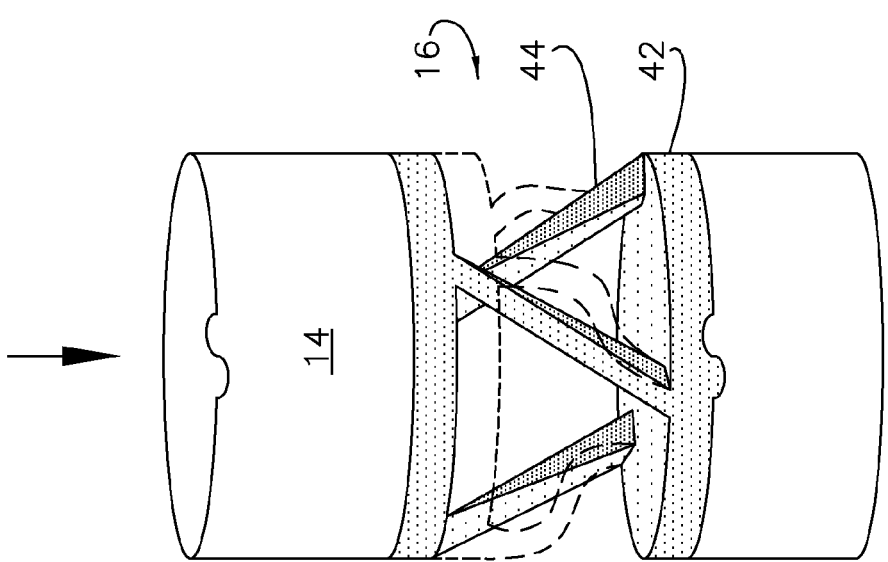
FIG. 5 is a perspective view of a column segment including a fourth embodiment of the energy-absorption element, wherein the element comprises first and second discs interconnected by a plurality of diagonal legs.

In another embodiment, the absorption element 16 presents a ligament or joint within the column 12 that is able to either pseudoplastically or superelastically strain and/or deform, upon activation (FIG. 5). For example, in this configuration, the element 16 may include first and second discs 42 interconnected by at least one, and more preferably a plurality of legs 44. The discs 42 longitudinally abut and are fixedly attached to, such that the joint interconnects, adjacent members 14. In one configuration, the legs 44 are formed of SMA material in the martensite phase when deactivated. Here, it is appreciated that the stiffness of the legs 44 will be increased when thermally activated to the austenitic phase. As a result, the magnitude of energy absorption within the column 12 will be increased.

Figure 6:
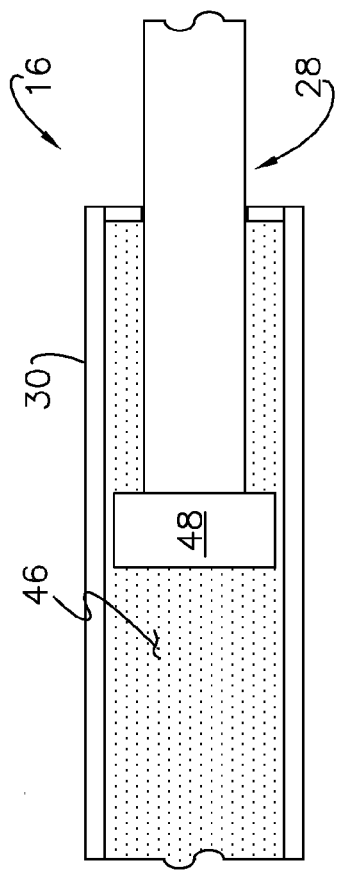
FIG. 6 is a side elevation view of a column segment including a fifth embodiment of the energy-absorption element, wherein the column includes first and second telescoping parts cooperatively defining an interior space, and the element includes magneto or electro-restrictive fluid housed within the space.
Figure 7:
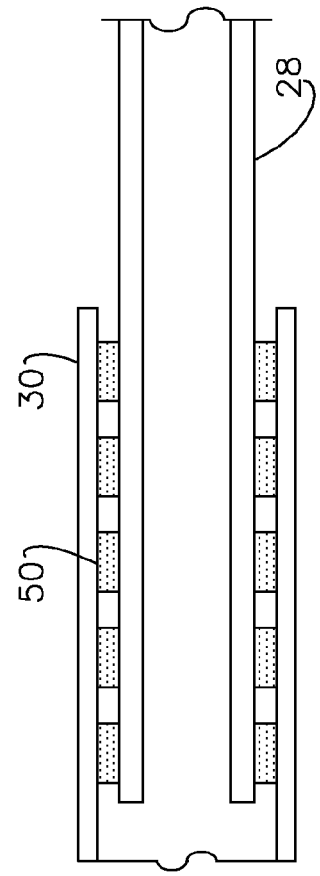
FIG. 7 is a side elevation view of a column segment including a sixth embodiment of the energy-absorption element, wherein the column includes telescoping first and second parts, and a plurality of piezoelectric members aligned and inter-engaged with the adjacent surfaces of the parts.
Figure 8:
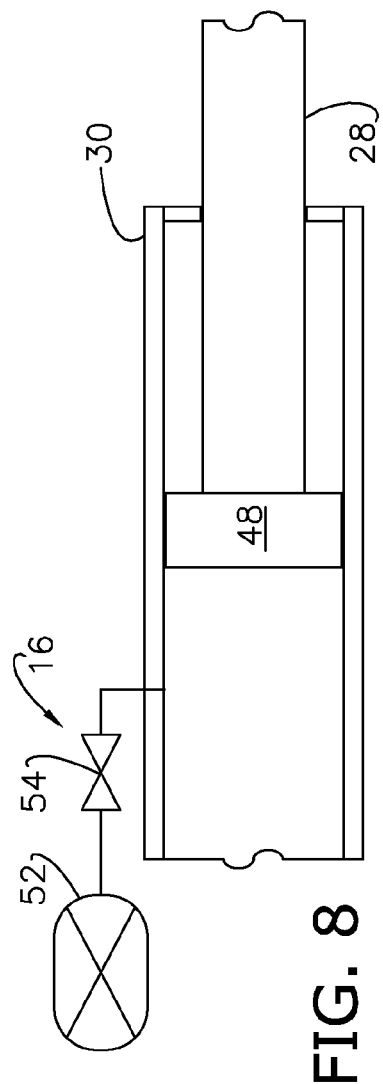
FIG. 8 is a side elevation view of a column segment including a seventh embodiment of the energy-absorption element, wherein the column includes first and second telescoping parts cooperatively defining an interior space, and the element includes an external pneumatic or hydraulic system communicating with the space and having an active material actuated valve.

In another embodiment, the shear strength of the material is modified when in the second phase, and the rate of energy absorption is increased as a result thereof. For example, where the column 12 includes telescoping first and second parts 28, 30, and an interior space is defined therebetween (e.g., both parts 28, 30 present closed adjacent ends, such as presented in a damper configuration, with the inner part 28 translating through an opening defined by the outer part 30), an active material, such as a magnetorheological or electrorheological fluid, can be housed within the space (FIG. 6). The parts 28, 30 are sealably engaged at the opening defined by the outer part 30. The enclosed end section 48 of the inner part 28 and interior wall of the outer part 30 cooperatively define a gap through which the fluid 46 is able to migrate. Differing resistive force, due to a change in fluid yield strength, is exhibited between the inner part 28 and fluid 46, when the material is in the activated and deactivated phases.

In yet another embodiment shown in FIG. 7, the column 12 again comprises relatively moving parts 28, 30, and the element 16 is configured to selectively decrease a clamping force or friction between the parts 28, 30. More particularly, the element 16 is configured to decrease friction by decreasing the normal force acting upon the parts 28, 30. For example, at least one, and more preferably a plurality of (unimorphic or bimorphic) piezoelectric composites 50 may be interposed between and configured to contact each of the parts 28, 30 in the deactivated phase. The composites 50 are fixedly attached to either the outer wall of the inner part 28 or the interior wall of the outer part 30, and secures the other through static friction. Friction between the composites 50 and the engaged part are caused to decrease, when the piezoelectric material is activated, as a result of the contraction of the composites 50. The decreased normal and consequential friction forces increase the amount of energy absorption by the column 12 by enabling the parts 28, 30 to slide during the event.

Finally, it is also within the ambit of the invention to utilize active materials to effect gradual, incremental or absolute engagement between the column 12 and a fluidly coupled external system 52 (FIG. 8), so as to cause energy absorption to modify. For example, where the column 12 is fluidly coupled to a pneumatic or hydraulic system 52 through a valve 54, active material actuation may be used to manipulate the valve 54. Manipulating the degree of opening in the valve 54 allows the space defined by parts 28, 30 to be engaged by a differing amount of pneumatic or hydraulic pressure and flow. Here, minimal to no gap is provided between the inner part section 48 and outer part 30. As a result of changing the fluid pressure, the stroking force and thus magnitude of energy absorption is modified.

It is appreciated that each of the embodiments described herein may be reversibly operable by deactivating a normally activated element 16 to effect either a decrease or an increase in energy absorption.

This invention has been described with reference to exemplary embodiments; it will be understood by those skilled in the art that various changes may be made and equivalents may be substituted for elements thereof without departing from the scope of the invention. For example, other equivalently functioning active materials may be used in lieu of or in addition to the materials described herein. In addition, many modifications may be made to adapt a particular situation or material to the teachings of the invention without departing from the essential scope thereof. Therefore, it is intended that the invention not be limited to a particular embodiment disclosed as the best mode contemplated for carrying out this invention, but that the invention will include all embodiments falling within the scope of the appended claims.

What is claimed is:

1. A steering column adapted for use with a motor vehicle, and having selective energy-absorption capabilities, said column comprising:
   a structural member configured to transfer an impact force generated during a crash event;
   an energy-absorption structural element communicatively coupled to and concentrically aligned with the member so as to receive the force therefrom, and formed at least in part of an active material changeable between first and second phases, when exposed to and occluded from an activation signal,
   said element and force being cooperatively configured such that the element is caused to be deformed by and therefore absorbs energy from the force at a first energy-absorbing magnitude in the first phase and at a second energy-absorbing magnitude in the second phase.

2. The column as claimed in claim 1, further comprising:
   at least one sensor operable to predict an impending crash event, and cause the signal to be generated when the event is predicted.

3. The column as claimed in claim 1, further comprising:
   at least one sensor operable to detect actual event-associated forces, displacements or accelerations, and cause the signal to be generated when the event is detected.

4. The column as claimed in claim 1, wherein the material is selected from the group consisting essentially of shape memory alloys, shape memory polymers, electro-active polymers, magnetorheological compositions, and electrorheological compositions.

5. The column as claimed in claim 1, wherein the element is configured to provide a selected stroking magnitude from a plurality of adjustable magnitudes of energy-absorption.

6. The column as claimed in claim 5, further comprising:
at least one sensor operable to determine a crash event; and
a controller communicatively coupled to the sensor and element,
said sensor and controller being cooperatively configured to determine the severity of the event, and cause the signal to be generated when the event is determined,
said magnitudes being correlated to the severity of the event.

7. The column as claimed in claim 6, wherein the controller is configured to receive and the severity of the event is determined based on the vehicle mass, current velocity, crush force, nature of encountering object, seat belt usage, air-bag deployment, seat for-aft position and torso proximity to steering wheel.

8. The column as claimed in claim 5, further comprising:
a controller communicatively coupled to the element and configured to receive an input related to an anthropometric characteristic of the driver,
said controller being configured to cause the signal to be generated when the event is determined,
said magnitude being correlated to the input.

9. The column as claimed in claim 5, further comprising:
a controller communicatively coupled to the element and configured to receive an input related to the expected crash pulse of the vehicle,
said controller being configured to cause the signal to be generated when the event is determined,
said magnitude being correlated to the input.

10. A method of effecting steering wheel stroking during a crash event utilizing active material actuation, said method comprising the steps of:
a. securing a steering column in a fixed position relative to a steering wheel, wherein the column comprises an active material presenting a first phase, and presents a first rate of energy absorption;
b. determining the occurrence of the event;
c. exposing the material to an activation signal so as to cause the material to change to a second phase, and consequentially modify the magnitude of energy absorption to a second magnitude greater than the first as a result thereof, when the event is determined, wherein step c) further includes the steps of changing the stiffness or modulus of the material when the material changes to the second phase, and modifying the magnitude as a result thereof; and
d. sustaining an impact force through the column and wheel, and absorbing energy therefrom at the second magnitude, during the event.

11. The method as claimed in claim 10, wherein the column further includes telescoping first and second parts, the adjacent surfaces of the parts present collapsible surface bumps consisting of the material, the bumps are caused to inter-engage when the parts telescope, and the bumps more facilely collapse, when the material is in the second phase relative to the first.

12. The method as claimed in claim 10, wherein the column further includes one or more mechanical interlocks, and step c) further includes the steps of causing the displacement of, so as to release or engage interlocks when the material changes to the second phase.

13. The method as claimed in claim 10, wherein step c) further includes the steps of increasing the recoverable pseudoplastic strain capability of the material when in the second phase, and modifying the rate as a result thereof.

14. The method as claimed in claim 10, wherein step c) further includes the steps of increasing the recoverable super-elastic strain capability of the material when in the second phase, and modifying the magnitude as a result thereof.

15. The method as claimed in claim 10, wherein step c) further includes the steps of increasing the shear strength of the material when in the second phase, and modifying the magnitude as a result thereof.

16. The method as claimed in claim 15, wherein the column further includes telescoping first and second parts, the parts cooperatively define an interior space, and a magneto-restrictive or electro-restrictive fluid is housed within the space, such that the parts, when telescoping, experience differing resistive forces, depending on the magnitude of the applied field.

17. The method as claimed in claim 10, wherein the column is fluidly coupled to a pneumatic or hydraulic system through a valve, and step c) further includes the steps of manipulating the valve as a result of changing the material to the second phase, and modifying the magnitude as a result of manipulating the valve.

* * * * *